No. 65,846.   PATENTED JUNE 18, 1867.
H. C. VAN TINE.
APPARATUS FOR BURNING PETROLEUM OR OTHER HYDROCARBONS.

Witnesses;
H. M. Mathews.
S. H. Christy.

Inventor;
Henry C. Van Tine
by Bakewell & Christy
his Attorneys

United States Patent Office.

HENRY C. VAN TINE, OF PITTSBURG, PENNSYLVANIA.

*Letters Patent No. 65,846, dated June 18, 1867*

---

APPARATUS FOR BURNING PETROLEUM AND OTHER HYDROCARBONS.

---

*The Schedule referred to in these Letters Patent and making part of the same.*

---

TO ALL WHOM IT MAY CONCERN:

Be it known that I, HENRY C. VAN TINE, of the city of Pittsburg, in the county of Allegheny, and State of Pennsylvania, have invented a new and useful improvement in Apparatus for Using Petroleum and Other Hydrocarbons as Fuel; and I do hereby declare the following to be a full, clear, and exact description thereof, reference being had to the accompanying drawing, forming part of this specification.

Like letters of reference indicate like parts in each figure.

Figure 1:
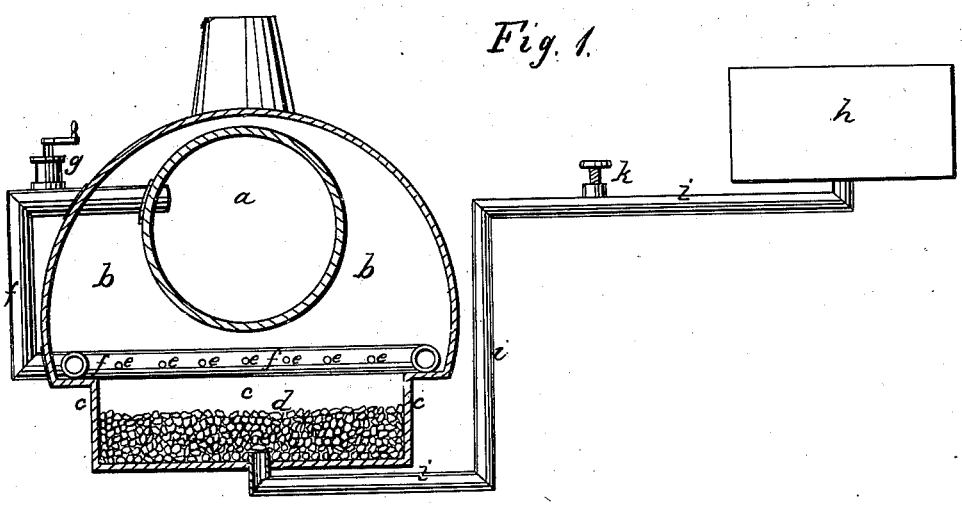
Figure 1 represents the application of my improvement to a steam boiler, and is a vertical cross-section through the apparatus.
Figure 2:
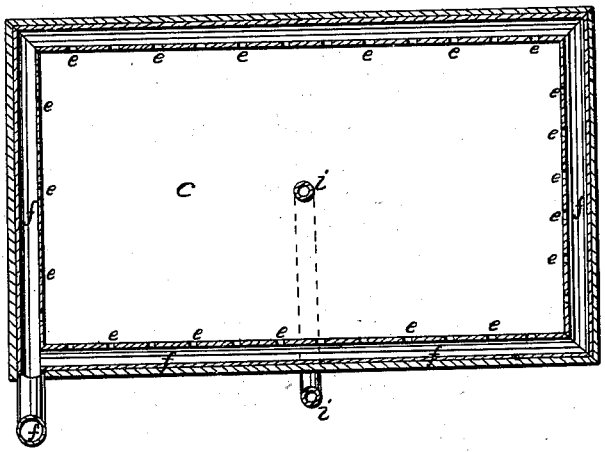
Figure 2 is a horizontal section through the line $xx$ of fig. 1.

The object of my invention is the effective, safe, and economical use of petroleum, either crude or refined, or any of its inflammable products or compounds, as fuel for fires or furnaces of all descriptions, for various purposes, such as heating or cooking, for steam boilers or generators, either stationary or locomotive, and for the numerous processes in the arts and manufactures in which furnaces are employed.

By my apparatus I am enabled to use as fuel crude or unrefined petroleum, which is of course cheaper than kerosene or refined oil, or benzine, which is a waste product and is consequently very cheap, as well as any other of the products of the refinement of carbon oil.

The chief obstacles encountered in the practical application of petroleum and its products or compounds to the purposes above indicated arise from their highly inflammable character, and the danger of explosion incident to the formation of gas or gaseous vapor; the difficulty of controlling the combustion and of supplying oxygen in sufficient quantity to consume the large amount of free carbon evolved and produce anything like a perfect combustion.

The use of a trough or vessel of water as a bed for the petroleum overcomes some of the obstacles named, but only increases the difficulty of controlling the fires, as it adds to the volume of fluid, and in case of any excessive supply of water, the burning oil which floats on the surface of the water would overflow, carrying destruction in its path.

These practical difficulties I propose to overcome by supplying the petroleum or other hydrocarbon fluid used as fuel into a vessel containing gravel or small stones, sufficiently coarse to prevent their being easily choked with organic matter, and yet fine enough to afford sufficient capillary attraction to cause the fluid to feed readily upwards to the surface of layer of gravel on which it is burned; and by supplying oxygen in intimate admixture with the gas and vapor and free carbon produced by the heat and combustion, by means of jets of steam issuing through a perforated pipe or arrangement of pipes.

To enable others skilled in the art to make use of my improvement, I will proceed to describe the construction and operation of the apparatus which I use for the purpose of carrying the same into practical use as applied to the generation of steam in a boiler.

In the accompanying drawing, $a$ is a steam boiler, which may be surrounded partially or entirely by the walls of the combustion-chamber $b$ of the furnace. Under the boiler $a$, and connected with the combustion-chamber $b$, is a shallow trough or pan, $c$, occupying the position of the furnace or fire-grate. This trough may be made of cast or wrought iron, sufficiently deep to receive a bed of gravel or small stones, $d$, about six inches thick. Surrounding this trough is a perforated steam pipe, $f$, having a number of small apertures, $e$, so situated as to allow the jets of steam issuing therefrom to play directly into the flame of the burning petroleum on the surface of the bed of gravel. This steam pipe $f$ connects with the steam space of the steam generator or boiler $a$, and is supplied with a valve or cock, $g$, to regulate the supply of steam to the perforated pipe $f$. From a tank or reservoir, $h$, placed at a safe distance from the furnace, a pipe, $i$, leads to the fire-pan or trough $c$, and opens into the bottom of the trough under the gravel. This pipe is supplied with a cock or valve, $k$, to regulate the flow of oil or other hydrocarbon liquid from the tank $h$ into the fire-pan $c$. The supply pipe $i$ may have two or more branches, each opening into the fire-pan $c$ at different points. The fire-chamber $b$ and boiler $a$ may be constructed with flues so as to conduct the flame and heat through the boiler, or to any point that may be desired, depending on the nature and use of the apparatus to which my invention is to be applied. If the apparatus is not used with a steam boiler, a small steam generator may be used especially for the purpose of supplying steam to the fire. The perforated pipe $f$ may be placed in any other convenient position than that described, which may be preferred, but its location at the circumference of the fire-pan $c$ I consider best, as it is there less exposed to the heat. The fire-pan $c$ may be made of stone, or any other non-combustible substance or composition, if preferred to iron, as it does not become highly heated, being protected by the layer of gravel excepting at the upper part of the sides, and may be filled with gravel, if desired, so as to protect it entirely from the direct action of the fire.

The operation of my apparatus is as follows: Petroleum or other hydrocarbon fluid, to be used as fuel, contained in the tank $h$, is allowed to flow into the fire-pan $c$, so as to saturate the gravel therein; the flow of oil being regulated by the stop-cock $k$, so as to supply the necessary amount for combustion, and no more. The oil is then lighted on the surface of the gravel, and burns freely, the gravel serving as a wick. When the fire is first lighted, and before steam is generated, coal, wood, or other fuel may be placed on top of the gravel so as to heat the boiler and aid in consuming the smoke evolved from the burning oil before steam is injected. As soon as steam is produced it is admitted by the pipe $f$ through the perforations $e$, and forcing its way in jets through the smoke and gas evolved from the burning oil, it is by the heat decomposed into its elements, oxygen and hydrogen, which mingle with the products of combustion of the oil, and uniting with the carbon with vivid combustion produce an intense heat. Air may also be introduced, as may be found desirable, in the usual manner.

It is manifest that by use of my improvement there is no danger of the spilling of oil from the fire-pan if the supply be not excessive, which renders it peculiarly applicable to furnaces for locomotives or steam vessels, the motion of which makes it almost impossible otherwise to use the fluid hydrocarbons for fuel. The use of the gravel also serves to keep the fire-pan cool, and lessens the amount of gas evolved from the oil or other fluid hydrocarbon before it is ignited.

Having thus described my improvement, what I claim as my invention, and desire to secure by Letters Patent, is—

The use of a fire-pan, filled or partially filled with gravel or small stones, and supplied with petroleum or other hydrocarbon fluid by a pipe or pipes, in combination with a perforated pipe or pipes for admitting jets of steam into the fire-space above the surface of the gravel, substantially as and for the purposes hereinbefore described.

In testimony whereof I, the said HENRY C. VAN TINE, have hereunto set my hand.

H. C. VAN TINE.

Witnesses:
  ALLAN C. BAKEWELL,
  GEO. B. CUSHING.